United States Patent
Hagenlocher et al.

(10) Patent No.: US 9,452,544 B2
(45) Date of Patent: Sep. 27, 2016

(54) METHOD FOR MONITORING CUTTING PROCESSING ON A WORKPIECE

(71) Applicant: TRUMPF Laser- und Systemtechnik GmbH, Ditzingen (DE)

(72) Inventors: Tobias Hagenlocher, Ditzingen (DE); Markus Zimmermann, Leinfelden-Echterdingen (DE)

(73) Assignee: TRUMF Laser- und Systemtechnik GmbH, Ditzingen (DE)

( * ) Notice: Subject to any disclaimer, the term of this patent is extended or adjusted under 35 U.S.C. 154(b) by 494 days.

(21) Appl. No.: 13/966,455

(22) Filed: Aug. 14, 2013

(65) Prior Publication Data

US 2013/0327194 A1 Dec. 12, 2013

Related U.S. Application Data

(63) Continuation of application No. PCT/EP2011/071708, filed on Dec. 5, 2011.

(30) Foreign Application Priority Data

Feb. 15, 2011 (DE) .................. 10 2011 004 117

(51) Int. Cl.
  *B23K 26/03* (2006.01)
  *B23K 26/38* (2014.01)
  *B26D 5/00* (2006.01)

(52) U.S. Cl.
  CPC ............. *B26D 5/007* (2013.01); *B23K 26/032* (2013.01); *B23K 26/38* (2013.01); *B23K 26/702* (2015.10); *B23K 2203/04* (2013.01); *Y10T 83/04* (2015.04); *Y10T 83/865* (2015.04)

(58) Field of Classification Search
  CPC . Y10T 83/533; Y10T 83/505; Y10T 83/515; Y10T 83/091; Y10T 83/145; Y10T 83/865; B23K 2203/04; B23K 26/032; B23K 26/38; B23K 26/702; B26D 5/007
  See application file for complete search history.

(56) References Cited

U.S. PATENT DOCUMENTS 4,504,727 A    3/1985   Melcher et al.
4,873,414 A *  10/1989  Ma .................. B23K 26/032
                                            219/121.62

(Continued)

FOREIGN PATENT DOCUMENTS

DE    69114399 T2   3/1996
DE    10305876 A1   8/2004

(Continued)

OTHER PUBLICATIONS

Machine translation of Japan Patent document No. 11-170,074, Jan. 2016.*

(Continued)

*Primary Examiner* — Geoffrey S Evans
(74) *Attorney, Agent, or Firm* — Fish & Richardson P.C.

(57) ABSTRACT

A method for monitoring cutting processing on a workpiece whereby a part of the workpiece is separated from a remainder of the workpiece along a desired cut contour, wherein, after the cutting processing, the following steps are carried out: irradiating the workpiece with a laser beam at a location within the desired cut contour, detecting radiation generated by an interaction between the laser beam and the workpiece, and evaluating the detected radiation to determine whether, during the cutting processing, the part of the workpiece was completely separated from the remainder of the workpiece. The invention also relates to a laser processing machine for carrying out the method.

10 Claims, 2 Drawing Sheets

(56) References Cited

U.S. PATENT DOCUMENTS

| | | | |
|---|---|---|---|
| 5,155,328 A | 10/1992 | Ikawa | |
| 5,166,891 A * | 11/1992 | Reiter | G01B 11/12 700/166 |
| 5,517,420 A * | 5/1996 | Kinsman | B23K 26/03 219/121.6 |
| 5,618,454 A | 4/1997 | Freedenberg et al. | |
| 5,763,853 A | 6/1998 | Shimomura et al. | |
| 7,062,845 B2 * | 6/2006 | Burgess | B23K 26/0626 219/121.6 |
| 2007/0114213 A1 * | 5/2007 | Chen | B23K 26/032 219/121.75 |
| 2008/0055588 A1 * | 3/2008 | Nomaru | B23K 26/03 356/73 |
| 2008/0220590 A1 | 9/2008 | Miller et al. | |
| 2009/0050612 A1 | 2/2009 | Serruys et al. | |
| 2011/0017715 A1 * | 1/2011 | Marcus | B23K 26/032 219/121.71 |
| 2011/0132883 A1 * | 6/2011 | Sheng | B23K 26/032 219/121.72 |

FOREIGN PATENT DOCUMENTS

| | | |
|---|---|---|
| DE | 102010028179 A1 | 10/2011 |
| EP | 1433563 A2 | 6/2004 |
| EP | 1886757 A1 | 2/2008 |
| JP | 03077790 A | 4/1991 |
| JP | 04-017987 A * | 1/1992 |
| JP | 06-045730 A * | 2/1994 |
| JP | 10-015679 A * | 1/1998 |
| JP | 11-170074 A * | 6/1999 |
| JP | 2002331383 A | 11/2002 |
| JP | 2006-315033 A * | 11/2006 |
| KR | 20030007167 A | 1/2003 |
| KR | 20100031065 A | 3/2010 |

OTHER PUBLICATIONS

Machine translation of Japan Patent document No. 2006-315,033, 016/2016.*

Notification of Transmittal of translation of the International Preliminary Report on Patentability for corresponding PCT Application No. PCT/EP2011/071708, issued Aug. 21, 2013, 7 pages.

* cited by examiner

METHOD FOR MONITORING CUTTING PROCESSING ON A WORKPIECE

CROSS REFERENCE TO RELATED APPLICATIONS

This application is a continuation of and claims priority under 35 U.S.C. §120 to PCT Application No. PCT/EP2011/071708 filed on Dec. 5, 2011, which claimed priority to German Application No. 10 2011 004 117.6 filed on Feb. 15, 2011. The contents of both of these priority applications are hereby incorporated by reference in their entirety.

TECHNICAL FIELD

The present invention relates to methods and laser processing machines for cutting processing and monitoring cutting processing on a workpiece for separating a part of the workpiece from a remainder of the workpiece along a desired cut contour

BACKGROUND

The cutting processing of plate-like workpieces, e.g., metal sheets, can be effected by thermal processing such as laser beam cutting, or by mechanical processing, e.g., by stamping processing (nibbling). During laser processing, the cutting is carried out by a laser processing head that is moved along a predefined cut contour relative to a workpiece arranged in a processing plane. To produce the relative movement, the laser processing head and/or the workpiece can be displaced in the processing plane. During cutting of a workpiece by stamping processing, the stamping process is generally performed on a stationary stamping press, the workpiece being displaced in the processing plane. Both stamping and thermal processing can be performed on one and the same machine tool.

During cutting processing, the workpiece is separated along a (typically closed) cut contour into one or a plurality of parts of the workpiece and a remainder of the workpiece (residual part or residual lattice). The parts of the workpiece fall from the residual lattice upon being completely cut free and can, if they are parts of acceptable quality, be supported on supporting elements arranged below the residual lattice. However, the parts of the workpiece that have been cut free can also be waste that is disposed of after being cut free.

During the process of separating by cutting, individual parts of the workpiece, in particular cutting swarf (or filings or chips), on account of process faults or incorrectly set process parameters, may not be completely cut free or possibly not cut free at all from the residual lattice. These incorrectly cut parts of the workpiece therefore do not fall from the residual lattice, with the result that a complete perforation in the residual lattice does not arise during cutting processing within the desired cut contour. Such a fault is generally not detected during automated manufacture and may possibly be identified by an operator or some other process participant only during subsequent quality inspection. In this context, cutting swarf constitutes parts of the workpiece which are cut out from parts of acceptable quality to produce the contour as desired and are predominantly disposed of as waste.

U.S. Pat. No. 4,504,727 describes a system for controlling laser processing on a circuit board. During drilling processing through a plurality of layers composed of different layer materials, with the aid of a photoacoustic signal generated by the pulsed laser beam in the respective layer material, a cutting end point can be identified and a cutting fault can be avoided.

EP 1 886 757 A1 describes an apparatus and a method for online monitoring of the quality of a laser process on a workpiece by a thermal imaging camera. The thermal imaging camera detects radiation from a zone of interaction of the laser beam with the workpiece. On the basis of the thermal image, it is possible to deduce, for example, incomplete severing of the workpiece during a cutting process.

A laser processing machine for detecting a cutting fault during a cutting process has also been disclosed in JP 03077790 A. A photodetector arranged below the workpiece in the region of a cut gap detects laser radiation passing through the cut gap. If the photodetector no longer detects radiation, the workpiece was not completely severed during laser cutting, and so a cutting fault is present.

JP 2002 331 383 A describes a device for monitoring a thermal cutting process, in which an actual cut gap width is compared with a desired cut gap width to determine a cutting fault. To determine the actual cut gap width, an apparatus rotating around a flame cutting device is provided, which apparatus allows observation of the cut gap behind the flame cutting device.

DE 691 14 399 T2 has disclosed an apparatus which makes it possible to detect the end of piercing or severing during the cutting of metal surfaces. This apparatus has a sensor head for detecting light generated at a surface of a (metallic) workpiece during the laser processing. The apparatus detects the end of severing during a piercing process on the basis of a signal drop of the detected signal. Subsequently, a cutting process is initiated and a reference voltage value of a voltage derived from the signal is used to determine whether the cutting process proceeds correctly or erroneously.

SUMMARY

The system and methods described herein advantageously provide a method and a laser processing machine that permits the complete cutting-free of a part of a workpiece to be checked in an automated manner after a cutting processing of the workpiece. This advantage can be achieved by a method, wherein, after the cutting processing, the following steps are carried out: irradiating the workpiece with a pulsed laser beam or laser beam pulse at a location within the desired cut contour, detecting radiation generated by an interaction between the laser beam and the workpiece, and evaluating the detected radiation to check whether, during the cutting processing, the part of the workpiece was completely separated from the remainder of the workpiece.

In the case of correct cutting processing with a closed contour, the part of the workpiece, in particular the cutting swarf, is completely separated from the remainder of the workpiece. This part falls out of the workpiece plane from the remainder of the workpiece or residual lattice downward, such that workpiece material is no longer present within the desired cut contour. If the laser beam in this case is radiated at a location within the desired cut contour in a beam propagation direction substantially perpendicular to the surface of the workpiece, the laser beam radiates through the perforation formed or the hole formed there into empty space. In this case, no interaction takes place between the laser beam and the workpiece, and so zero or an extremely low radiation intensity is detected.

By contrast, if the part of the workpiece is not separated completely freely during the cutting processing, then it remains (possibly in a tilted manner) in the residual lattice. In this case, the laser beam interacts with the workpiece in the region of the purportedly cut hole or perforation, in which case radiation arises, on the basis of which a faulty cutting process can be deduced. In this case, it typically suffices for only a single laser pulse to be radiated onto a location within the desired cut contour, that is to say that a laser beam having a plurality of successive pulses is not necessarily required. Conversely, however, the individual laser pulse can also be represented by a plurality of successive pulses.

By evaluation of the detected radiation, direct automated monitoring of the processing result is thus possible. The monitoring after the cutting processing can be effected here in each case after an individual (closed) cut contour has been produced; alternatively, however, it is also possible to carry out the monitoring only when all or a group of (closed) contours have been cut on a workpiece (sheet-metal panel). By contrast, if a part of the workpiece that has not been completely cut free is noticed only after one or more subsequent process steps, e.g., after the component has been lacquered and mounted, then the rejects produced in this case are associated with high costs.

In some embodiments, the detected radiation is process light and/or thermal radiation generated during the interaction between the laser beam and the workpiece. During the interaction of the laser beam with the workpiece or the part of the workpiece that has not been completely cut free, process light emission arises with wavelengths typically in the UV (ultraviolet) or VIS (visible) range. This process light emission and/or thermal radiation (in the near infrared "NIR" or infrared "IR" range) generated when the workpiece is heated by the laser beam can be detected by a suitable detector. In particular, devices for process light monitoring that are already provided in a corresponding laser processing machine can also be used for detection purposes. During the detection of process light and/or thermal radiation, during the interaction of the laser beam with the part of the workpiece that has not been completely cut free, the latter is typically not damaged.

In further embodiments, the detected radiation is laser radiation reflected back from the workpiece. In this case, the workpiece consists of a material which at least partly reflects the laser radiation, which is typically the case for metallic workpieces, (e.g., metal sheets). If laser radiation reflected back from the workpiece is detected, the laser beam can be radiated in with a significantly lower power compared with the detection of process light emission and/or thermal radiation, since, in this case, partial melting of the workpiece at the location at which the laser beam impinges is not necessary. Besides the laser beam used for processing, alternatively it is also possible to use a different laser, in particular a laser having a different wavelength, such as a pilot laser, for irradiating the location within the desired cut contour.

In further embodiments, in the case where the part of the workpiece is not completely separated, the pulsed laser beam or laser beam pulse completely passes through the part of the workpiece at the location where it irradiates the workpiece. In this case, the workpiece can be irradiated with a laser beam or a laser pulse having a power and time duration sufficient for completely piercing the part of the workpiece. As an alternative to a fixed predefinition of the duration of the pulsed laser beam or laser beam pulse, complete piercing can also be identified on the basis of the detected radiation or the temporal profile of the detected radiation. In this case, the laser beam or laser beam pulse can be automatically switched off as soon as piercing has been detected.

In one embodiment, a tilting angle between the part of the workpiece that is not completely separated and the remainder of the workpiece is determined on the basis of the detected radiation. If the part of the workpiece is completely pierced by the impinging laser beam, the duration of the piercing process can be deduced on the basis of the time duration in which an increased radiation intensity is detected. Since the thickness of the material respectively pierced by the laser beam is dependent on the tilting angle, the tilting angle can be deduced from the time duration of the piercing process with reference to a material type. Alternatively, it is also possible to pierce the workpiece and, if no signal drop of the detected radiation indicating complete piercing is identified over a specific time duration, to deduce a tilting angle that is greater than a reference tilting angle. In this case, it is not necessary to completely pierce through the workpiece.

In further embodiments of the invention, a laser processing machine includes a laser processing head for radiating an in particular pulsed laser beam or laser beam pulse onto a location within the desired cut contour after the conclusion of the cutting processing, a detector unit for detecting radiation generated by an interaction between the laser beam and the workpiece, and an evaluation device, which is designed or programmed to check, on the basis of the detected radiation, whether the part of the workpiece was completely separated from the remainder of the workpiece during the cutting processing.

The detector can be designed for detecting process light, thermal radiation and/or laser radiation reflected from the workpiece. Moreover, the radiation intensity and the pulse duration of the laser beam can be set or made long such that the laser beam can completely pierce through the part of the workpiece possibly still present in the residual lattice. This can be utilized for determining a tilting angle of the part of the workpiece relative to the remainder of the workpiece with the aid of the evaluation device. In particular, an evaluation device or measurement sensor system already used for other tasks, e.g., for online monitoring during the cutting process, can be used here. For the present application, the evaluation device can be suitably programmed by a suitable evaluation algorithm being added to it.

Further advantages are evident from the description and the drawing. Likewise, the features mentioned above and those also presented below can be used in each case by themselves or as a plurality in any desired combinations. The embodiments shown and described should not be understood as an exhaustive enumeration, but rather are of exemplary character for illustrating the invention.

DESCRIPTION OF DRAWINGS

FIG. 1 shows a schematic illustration of a laser processing machine for the cutting processing of a workpiece.

DETAILED DESCRIPTION

Figure 2A:
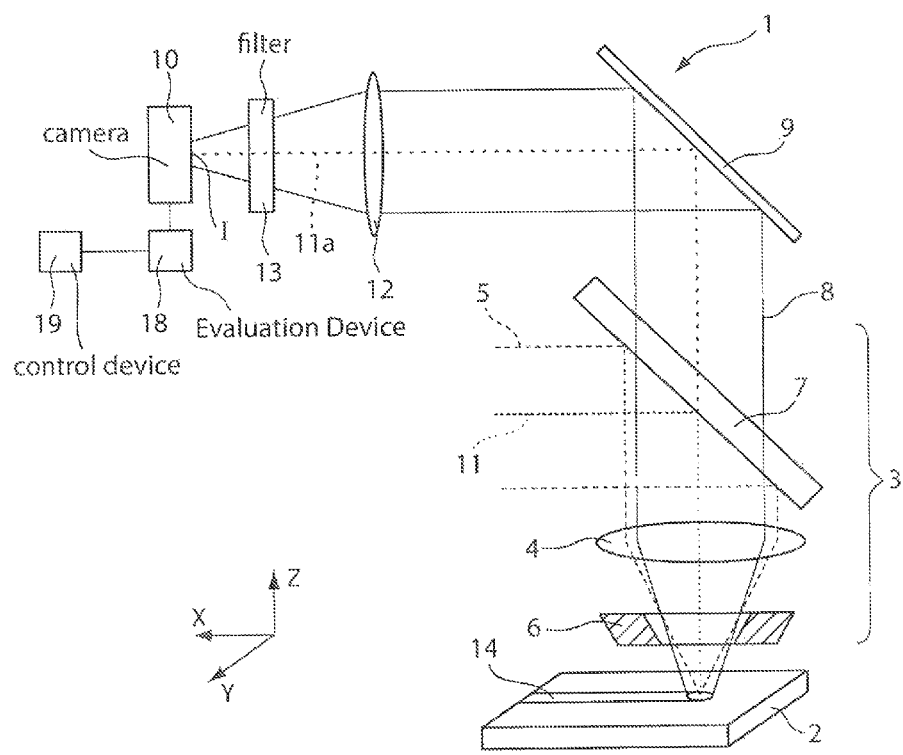
FIG. 2a and FIG. 2b show schematic illustrations of correct cutting processing (FIG. 2a) and erroneous cutting processing (FIG. 2b).

FIG. 1 shows a detail of a laser processing machine 1 for the cutting processing of a workpiece 2, the machine including a processing unit in the form of a laser processing head 3. The laser processing head 3 has a focusing lens 4 composed of zinc selenide for focusing a $CO_2$ laser beam 5 generated by a $CO_2$ laser (not shown), a cutting gas nozzle 6 and a deflection mirror 7. In the present case, the deflection mirror 7 is embodied as partly transmissive and reflects the incident $CO_2$ laser beam 5 (having a wavelength of approximately 10 μm) and transmits radiation 8 which is relevant to the process monitoring and which emerges from the workpiece 2 in a wavelength range of, in the present example, between approximately 550 nm and 2000 nm. The laser processing machine 1 described here can also have a solid-state laser beam source (not shown), such as a disk or fiber laser, having radiation in the 1 μm range or else frequency-converted.

In the laser processing machine 1, a further deflection mirror 9 is arranged behind the partly transmissive mirror 7 and deflects the radiation 8 onto a detector in the form of a camera 10. The camera 10 can be a high-speed camera arranged coaxially with respect to the laser beam axis 11 or with respect to the extension of the laser beam axis 11a and thus in a direction-independent manner. For improved imaging, in the present example, an imaging, focusing optical system 12, represented as a lens in FIG. 1, is provided between the partly transmissive mirror 7 and the camera 10 and focuses the radiation 8 relevant to the process monitoring onto the camera 10. Alternatively, it is also possible for the radiation not to be detected in a spatially resolved manner, e.g., by the use of one or more photodiodes as detector unit instead of the camera 10. To be able to detect laser radiation reflected at the workpiece 2, the partly transmissive deflection mirror 7 can also be replaced by some other form of beam splitter, e.g., by a perforated mirror, such that radiation having the wavelength of the laser beam 5 can also pass to the camera 10 and be detected.

In the example shown in FIG. 1, a filter 13 in front of the camera 10 is advantageous if further radiation or wavelength components are intended to be excluded from the detection by the camera 10. The filter 13 can be embodied e.g., as a narrowband bandpass filter having a low value of full width at half maximum. In principle, the possibility arises of capturing the image by the camera 10 in the reflected-light method (using an additional illumination source (not shown)) in the VIS wavelength range. If appropriate capture may also in the NIR wavelength range, if the additional illumination source radiates in the NIR range, and alternatively capturing the light emission intrinsic to the process or a thermal image in the UV and NIR/IR wavelength ranges. In particular, laser radiation reflected at the workpiece 2 in a wavelength range around approximately 10 μm can also be detected by an additional detector (not shown), which is fitted e.g., externally, on the laser processing head 3. It goes without saying that monitoring of the radiation relevant to the laser cutting process can also be carried out in some other way, for example in the manner described in DE 10 2010 028 179.4 in the name of the present applicant, which, with regard to this aspect, is incorporated herein by reference.

To carry out cutting monitoring during the laser cutting process shown in FIG. 1, in which process a cut gap 14 is formed in the workpiece 2, an evaluation device 18 performs an evaluation of an intensity I (of the radiation 8) measured by the camera 10. In this case, the evaluation device 18 can be used for online monitoring during the laser cutting process. In the present application, the evaluation device 18 is additionally used for cutting monitoring after the conclusion of the laser cutting, to check whether a part 2b of the workpiece that is to be separated was completely cut free from a remainder 2a of the workpiece during the preceding cutting processing along a desired cut contour 20 (see FIGS. 2a, b). This check can be made directly after the cutting of an individual cut contour, but alternatively it is also possible to carry out the check only when all or a group of (closed) contours have been cut on the workpiece 2 (sheet-metal panel).

In the present example, the desired cut contour 20 is circular, but it goes without saying that the geometry of the cut contour 20 can be arbitrary. In this case, the desired cut contour 20 is generally self-contained, but this is not absolutely necessary. In this regard, by way of example, for the case where an edge of the part of the workpiece that is to be separated forms an outer edge of the workpiece, the part of the workpiece can be separated from the remainder of the workpiece without cutting a closed contour. During the cutting processing, it can happen as a result of unfavorably chosen process parameters, for example, that the contour that has been cut does not correspond to the desired cut contour, with the result that a, for example web-shaped, link remains between the remainder 2a of the workpiece and the part 2b of the workpiece.

FIG. 2a shows the case of correct cutting processing, wherein during cutting along the cut contour 20 the part (not shown in FIG. 2a) of the workpiece to be removed was completely separated from the remainder 2a of the workpiece and fell downward from the workpiece 2, with the result that a circular hole 21 was formed in the remainder 2a of the workpiece. In this case, material is no longer present in the region within the cut contour 20.

Figure 2B:
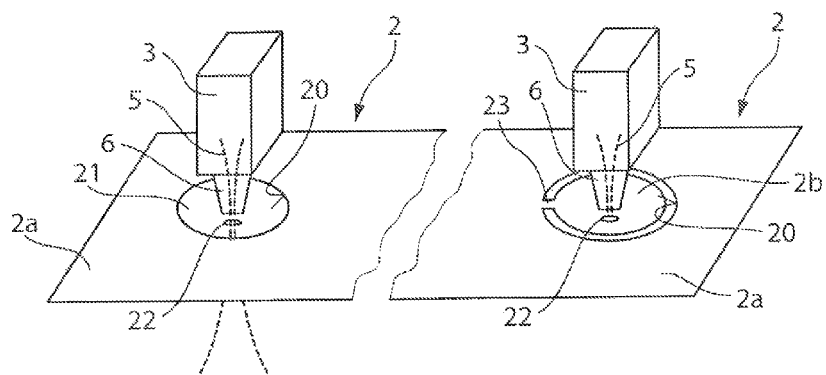

By contrast, FIG. 2b shows the case of erroneous cutting processing, wherein the part 2b of the workpiece was not completely separated from the remainder 2a of the workpiece and stayed in the remainder 2a of the workpiece since the part 2b of the workpiece is still connected to the remainder 2a of the workpiece via a web-shaped connection 23.

To check whether the part 2b of the workpiece was completely separated from the remainder 2a of the workpiece, in both cases shown the laser processing head 3 and/or the workpiece 2 are/is positioned in the XY plane by movement devices (not shown) such that the workpiece 2 is irradiated with a laser beam 5 oriented substantially perpendicular to the surface of the workpiece 2 at a location 22 within the cut contour 20. If a hole 21 is formed there, as shown in FIG. 2a, the laser beam 5 radiates into empty space. Accordingly, zero or only a slight radiation intensity I is detected by the detector 10. By contrast, if the part 2b of the workpiece is not completely cut free from the remainder 2a of the workpiece, as shown in FIG. 2b, the laser beam 5 interacts with the workpiece 2, or the part 2b of the workpiece that has not been cut free, in the region of the purportedly cut hole. In this case, radiation 8 arises in the form of light emission intrinsic to the process (thermal radiation on account of the heating of the workpiece 2 and laser radiation reflected back) which can be detected by the detector 10 or an additional detector in the manner described above.

If the evaluation device 18 (shown in FIG. 1) determines on the basis of the detected radiation 8 that a part 2b of the workpiece was not completely cut free, the evaluation device communicates a fault signal to a control device 19, which is signal-connected to the evaluation device 18. The control device 19 can optionally mark the faulty component or part of the workpiece, issue a warning to an operator, terminate the cutting process, or resume the cutting process, using other parameters if appropriate, completely or for a partial region of the contour to be cut.

The evaluation unit 18 can determine not only faulty cutting processing but also, in the case of a fault, a tilting angle α of the part 2b of the workpiece that has not been separated completely freely relative to the (XY) plane of the workpiece 2, as will be explained below with reference to FIGS. 3a-c. The tilting occurs on account of the inherent weight of the part 2b of the workpiece, which remains connected to the remainder 2a of the workpiece only via a link, e.g., a web-shaped link.

Figure 3A:
FIG. 3a, FIG. 3b and FIG. 3c show illustrations of measurement curves of the intensity of a laser beam and of the measured process light during interaction of the laser beam with a part of the workpiece that has not been completely cut free, at three different tilting angles.
Figure 3B:
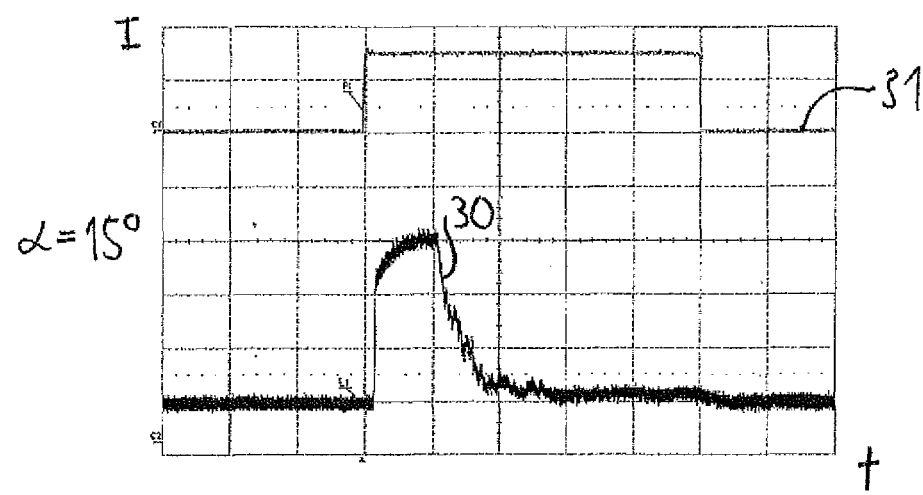
Figure 3C:
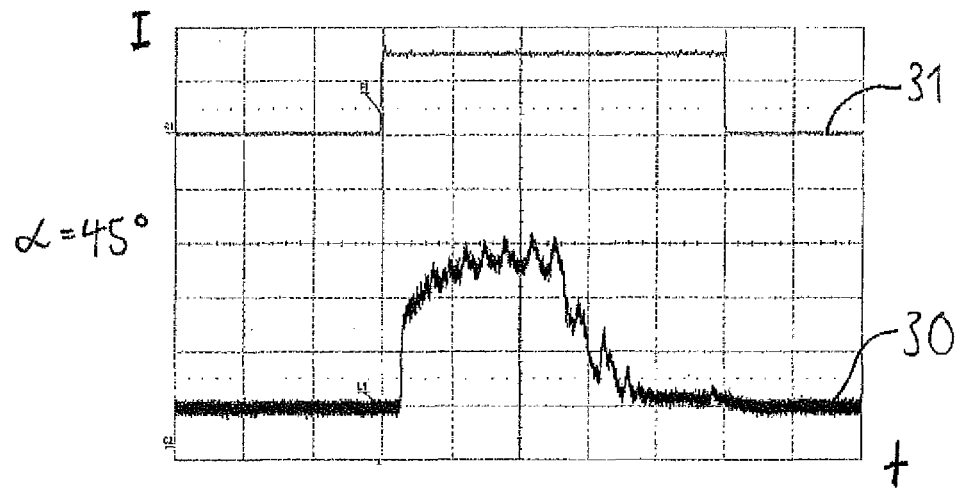

FIGS. 3a-c show example measurements of a process light signal 30 (e.g., radiation 8) recorded by the detector 10 and an intensity signal 31 of the (pulsed) laser beam 5. In the measurements shown in FIGS. 3a-c, the workpiece 2 consisted of structural steel having a thickness of approximately 1 mm.

In the case shown in FIG. 3a, the part 2b of the workpiece that was not completely cut free was situated without tilting in the plane of the remainder 2a of the workpiece (tilting angle α=0°, as shown in FIG. 2b). The total duration of the laser pulse 31 was 2 ms. The process light signal 30 rose greatly at the beginning of the laser pulse 31 and fell greatly again after approximately 0.3 ms. At this point in time, the material of the part 2b of the workpiece was completely pierced.

In the case shown in FIG. 3b, the part 2b of the workpiece was tilted downward at a tilting angle α=15° relative to the remainder 2a of the workpiece (XY plane). In this case, the laser pulse 31 had a time duration of 10 ms. The level of the measured process light signal 30 was lower than in the example shown in FIG. 3a and the piercing time until the subsidence of the level of the process light signal 30 increased.

In the case shown in FIG. 3c, the part 2b of the workpiece that was not freely separated was tilted even further, by a tilting angle of α=45°. In this case, the time duration of the laser pulse 31 was likewise 10 ms. Compared with the case shown in FIG. 3b, the measurement level of the process light signal 30 was lower and the piercing time lengthened again.

As becomes clear from FIGS. 3a-c, on the basis of the process light signal 30, more precisely on the basis of the profile of the measurement level measured during the piercing process, in particular the piercing duration, it is possible to determine the tilting angle α which the part 2b of the workpiece that remained in the remainder 2a of the workpiece forms relative to the plane of the remainder 2a of the workpiece. A calibration of the measurement can be performed by experiments preceding the cutting process on a predefined workpiece material (and with a predefined thickness). A saved database of results of these experiments correlating piercing duration to known tilt angle (measured by some other, independent method) can be used to look up (e.g., through a look-up table, equation, or interpolation between known results) can be consulted (by the control device 19, or by the operator) to determine the tilting angle α for a given workpiece 2.

To summarize, an automated test of the complete cutting-free of a part of a workpiece from a remainder of a workpiece can be performed by the method described above. The test described here can be carried out very rapidly since the relative movement between workpiece and laser processing head for positioning the laser beam within the cut contour and the piercing process require only a few milliseconds.

The cutting processing need not necessarily be effected by the laser beam; rather, the cutting processing can also be carried out by a stamping station (e.g., by nibbling) that is possibly additionally provided on the laser processing machine. In this case, too, after the cutting processing the laser beam can be positioned above the region of the part of the workpiece that is to be cut free.

A number of embodiments of the invention have been described. Nevertheless, it will be understood that various modifications may be made without departing from the spirit and scope of the invention. Accordingly, other embodiments are within the scope of the following claims.

What is claimed is:

1. A method for monitoring a cutting process on a workpiece whereby a part of the workpiece is separated from a remainder of the workpiece along a desired cut contour, the method comprising:
   completing a cutting process on the workpiece to separate a part of the workpiece from the remainder of the workpiece along a desired cut contour,
   after the cutting process is completed, irradiating the workpiece with a laser beam at a location within the desired cut contour,
   detecting radiation, if any, generated by an interaction between the laser beam and any remaining portion of the part of the workpiece within the desired cut contour, and
   automatically evaluating the detected radiation to determine whether, during the cutting process, the part of the workpiece was completely separated from the remainder of the workpiece.

2. The method of claim 1, wherein the detected radiation is process light generated during the interaction between the laser beam and the workpiece.

3. The method of claim 1, wherein the detected radiation is thermal radiation generated during the interaction between the laser beam and the workpiece.

4. The method of claim 1, wherein the detected radiation is laser radiation reflected back from the workpiece.

5. The method of claim 1, wherein the laser beam is a pulsed laser beam.

6. The method of claim 1, wherein the laser beam completely passes through the part of the workpiece at the location where it irradiates the part of the workpiece if the part of the workpiece is not completely separated.

7. The method of claim 1, comprising determining a tilting angle between the part of the workpiece that is not completely separated and the remainder of the workpiece on the basis of the detected radiation.

8. The method of claim 7, wherein determining the tilting angle includes directing the laser beam on the part of the workpiece until the part of the workpiece is completely pierced.

9. The method of claim 1, further comprising signaling a fault signal if it is determined that the part of the workpiece is not completely separated from the remainder of the workpiece.

10. The method of claim 1, wherein evaluating the detected radiation to determine whether, during the cutting process, the part of the workpiece was completely separated from the remainder of the workpiece comprises detecting zero or low radiation intensity.

* * * * *

UNITED STATES PATENT AND TRADEMARK OFFICE
CERTIFICATE OF CORRECTION

PATENT NO.         : 9,452,544 B2                                     Page 1 of 1
APPLICATION NO.    : 13/966455
DATED              : September 27, 2016
INVENTOR(S)        : Tobias Hagenlocher and Markus Zimmermann It is certified that error appears in the above-identified patent and that said Letters Patent is hereby corrected as shown below:

On the Title Page

Item (73), Column 1, (Assignee), delete "TRUMF Laser- und Systemtechnik" and insert
--TRUMPF Laser- und Systemtechnik--.

Signed and Sealed this
Seventh Day of February, 2017

Michelle K. Lee
*Director of the United States Patent and Trademark Office*